United States Patent
Zhang (10) Patent No.: US 9,223,712 B2
(45) Date of Patent: Dec. 29, 2015

(54) DATA CACHE METHOD, DEVICE, AND SYSTEM IN A MULTI-NODE SYSTEM

(71) Applicant: Huawei Technologies Co., Ltd., Shenzhen (CN)

(72) Inventor: Xiaofeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 13/968,714

(22) Filed: Aug. 16, 2013

(65) Prior Publication Data

US 2013/0346693 A1 Dec. 26, 2013

Related U.S. Application Data

(63) Continuation of application No. PCT/CN2011/077994, filed on Aug. 4, 2011.

(51) Int. Cl.
*G06F 12/00* (2006.01)
*G06F 12/08* (2006.01)

(52) U.S. Cl.
CPC ........ *G06F 12/0866* (2013.01); *G06F 12/0864* (2013.01); *G06F 12/0871* (2013.01); *G06F 12/084* (2013.01); *G06F 12/0842* (2013.01); *G06F 2212/222* (2013.01); *G06F 2212/261* (2013.01)

(58) Field of Classification Search
None
See application file for complete search history.

(56) References Cited

U.S. PATENT DOCUMENTS

| 7,743,200 | B1 | 6/2010 | Panwar et al. |
| 2003/0131200 | A1 | 7/2003 | Berg et al. |
| 2006/0143390 | A1 | 6/2006 | Kottapalli |
| 2009/0320036 | A1 | 12/2009 | Ries et al. |

FOREIGN PATENT DOCUMENTS

| CN | 1499382 A | 5/2004 |
| CN | 1620651 A | 5/2005 |

OTHER PUBLICATIONS

Foreign Communication From a Counterpart Application, European Application No. 11858742.7, Extended European Search Report dated Jan. 22, 2014, 6 pages.

*Primary Examiner* — Midys Rojas
(74) *Attorney, Agent, or Firm* — Conley Rose, P.C.; Grant Rodolph; Adam J. Stegge (57) ABSTRACT

A data cache method, device, and system in a multi-node system are provided. The method includes: dividing a cache area of a cache medium into multiple sub-areas, where each sub-area is corresponding to a node in the system; dividing each of the sub-areas into a thread cache area and a global cache area; when a process reads a file, detecting a read frequency of the file; when the read frequency of the file is greater than a first threshold and the size of the file does not exceed a second threshold, caching the file in the thread cache area; or when the read frequency of the file is greater than the first threshold and the size of the file exceeds the second threshold, caching the file in the global cache area. Thus overheads of remote access of a system are reduced, and I/O performance of the system is improved.

19 Claims, 8 Drawing Sheets

DATA CACHE METHOD, DEVICE, AND SYSTEM IN A MULTI-NODE SYSTEM

CROSS-REFERENCE TO RELATED APPLICATION

This application is a continuation of International Application No. PCT/CN2011/077994, filed on Aug. 4, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of data processing, and in particular, to a data cache method, device, and system in a multi-node system.

BACKGROUND

With the development of computer technologies, a computer system becomes more and more complex, and an existing computer system may include multiple modular nodes. In a multi-node computer system, design quality of a cache is an important factor affecting system performance. Through the cache, read and write speeds of data may be increased, so as to improve input/output (I/O) performance of the system.

A solid state disk (SSD), due to excellent read and write performance thereof, is used as a cache medium widely applied between a memory and a magnetic disk.

In an existing application, a set-associative mapping manner is adopted between an SSD cache and a magnetic disk. As show in FIG. 1, data of each magnetic disk area is cached in a corresponding SSD group (data of an area of a corresponding color is cached in a corresponding SSD area). When an application program needs to read data in a white area in a magnetic disk, whether the data is already cached in a white area of the SSD is retrieved first. In the prior art, some commonly used data is kept through an SSD cache, thereby decreasing the number of times of disk seek of a magnetic disk and increasing data read and write efficiency.

Figure 1:
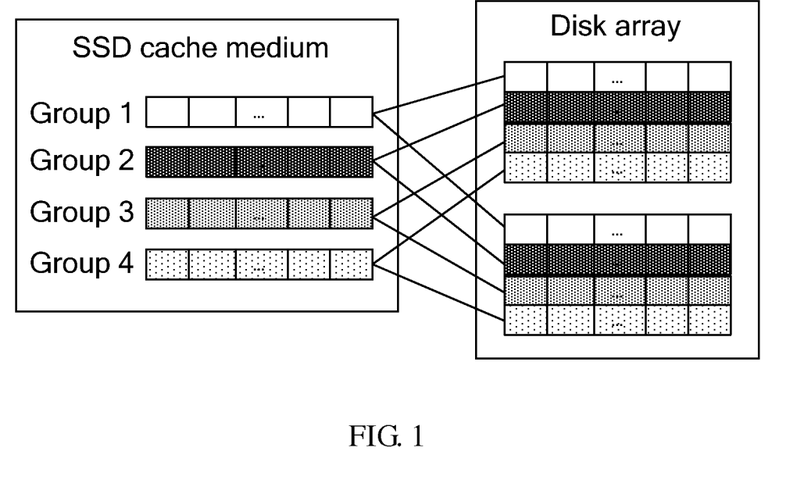
FIG. 1 is a schematic diagram of a data cache method in a multi-node system in the prior art.

However, when an SSD cache is applied in a multi-node computer system, as shown in FIG. 1, it is assumed that four areas of different colors in the SSD cache represent nodes 1, 2, 3 and 4 respectively in sequence. According to a set-associative mapping manner between the SSD cache and a magnetic disk, data in a white area of the magnetic disk can only be cached in a cache area of the node 1. Even if the system identifies that the data in the white area of the magnetic disk has affinity with the node 2, the data cannot be cached in a cache area of the node 2, thereby increasing overheads of remote access of the system, and reducing cache efficiency.

SUMMARY

An embodiment of the present invention provides a data cache method in a multi-node system, so as to identify an affinity node when data cache is performed in a multi-node computer system.

An embodiment of the present invention provides a data cache method in a multi-node system, where the system at least includes a cache medium and a disk array, and where the method includes: dividing a cache area in the cache medium into multiple sub-areas, where each sub-area is corresponding to a node in the system; and dividing each of the sub-areas into a thread cache area and a global cache area, where there is a mapping established between the thread cache area and the disk array by adopting an associative mapping manner, and there is a mapping established between the global cache area and the disk array by adopting a set-associative mapping manner; when a process reads a file, detecting a read frequency of the file; and if the read frequency of the file is greater than a first threshold and the size of the file does not exceed a second threshold, caching the file in the thread cache area, or if the read frequency of the file is greater than the first threshold and the size of the file exceeds the second threshold, caching the file in the global cache area.

An embodiment of the present invention provides a mapping method for data cache in a multi-node system, where the system at least includes a cache medium and a disk array, and where the method includes: dividing a cache area in the cache medium into multiple sub-areas, where each sub-area is corresponding to a node in the system; and dividing each of the sub-areas into a thread cache area and a global cache area, where there is a mapping established between the thread cache area and the disk array by adopting an associative mapping manner, and there is a mapping established between the global cache area and the disk array by adopting a set-associative mapping manner.

An embodiment of the present invention further provides a data cache device in a multi-node system, where the system at least includes a cache medium and a disk array, and where the device includes: a first dividing unit configured to divide a cache area in the cache medium into multiple sub-areas, where each sub-area is corresponding to a node in the system; a mapping unit configured to divide each of the sub-areas into a thread cache area and a global cache area, where there is a mapping established between the thread cache area and the disk array by adopting an associative mapping manner, and there is a mapping established between the global cache area and the disk array by adopting a set-associative mapping manner; a detecting unit configured to, when a process reads a file, detect a read frequency of the file; and a control unit configured to, if the read frequency of the file is greater than a first threshold and the size of the file does not exceed a second threshold, cache the file in the thread cache area, or if the read frequency of the file is greater than the first threshold and the size of the file exceeds the second threshold, cache the file in the global cache area.

An embodiment of the present invention provides a mapping device for data cache in a multi-node system, where the system at least includes a cache medium and a disk array, and where the device includes: a first dividing unit configured to divide a cache area in the cache medium into multiple sub-areas, where each sub-area is corresponding to a node in the system; and a mapping unit configured to divide each of the sub-areas into a thread cache area and a global cache area, where there is a mapping established between the thread cache area and the disk array by adopting an associative mapping manner, and there is a mapping established between the global cache area and the disk array by adopting a set-associative mapping manner.

An embodiment of the present invention further provides a system including the data cache device in a multi-node system.

It can be seen from the technical solutions that, in the embodiments of the present invention, a cache area of each node is divided into a thread cache area and a global cache area, where the thread cache area and a disk array adopt an associative mapping manner, and the global cache area and the disk array adopt a set-associative mapping manner, thereby cleverly solving the problem in the prior art that a single cache area cannot identify an affinity node, reducing overheads of remote access of the system, and increasing efficiency of data access. Meanwhile, files of different sizes are cached in different cache areas, thereby increasing a utilization rate of a cache space and a hit rate of file reading.

DETAILED DESCRIPTION

In order to make the objectives, technical solutions, and advantages of the present invention more comprehensible, the present invention is described in further detail below with reference to the accompanying drawings and embodiments. It should be understood that specific embodiments described here are only intended to explain the present invention, rather than to limit the present invention.

In embodiments of the present invention, a cache area of each node is divided into a thread cache area and a global cache area, where the thread cache area and a disk array adopt an associative mapping manner, and the global cache area and the disk array adopt a set-associative mapping manner, thereby cleverly solving the problem in the prior art that a single cache area cannot identify an affinity node, reducing overheads of remote access of the system, and increasing efficiency of data access. Meanwhile, files of different sizes are cached in different cache areas, thereby increasing a utilization rate of a cache space and a hit rate of file reading.

In order to illustrate the technical solutions according to the present invention, illustration is provided below through specific embodiments.

Embodiment 1

Figure 2:
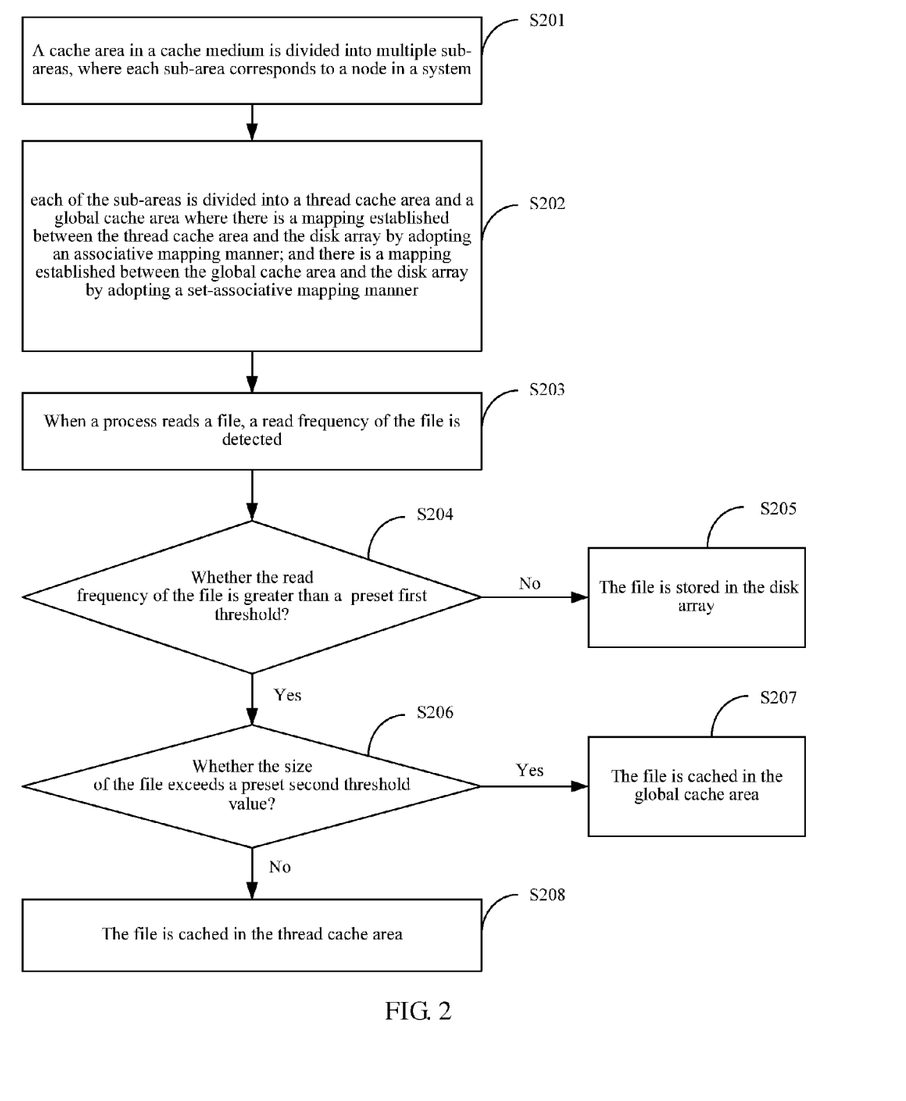
FIG. 2 is an implementation flow chart of a data cache method in a multi-node system provided in Embodiment 1 of the present invention.

FIG. 2 shows an implementation flow of a data cache method in a multi-node system provided in Embodiment 1 of the present invention, and detailed descriptions of processes of the method are as follows.

In step S201, a cache area in a cache medium is divided into multiple sub-areas, where each sub-area is corresponding to a node in a system.

In this embodiment, an architecture of the multi-node system includes, but is not limited to, a non-uniform memory access (NUMA) architecture, and the system at least includes the cache medium and a disk array. The cache medium includes, but is not limited to, an SSD, and any cache medium having read and write speeds higher than those of a magnetic disk but lower than those of a memory is applicable.

In this embodiment, the multi-node system includes multiple nodes, and each node has a respective independent processor. The multi-node system divides the cache area in the cache medium into multiple sub-areas, where each sub-area is corresponding to a node in the system. A manner of division includes, but is not limited to, even division. For example, it is assumed that the multi-node system includes a node 1 and a node 2; the node 1 includes a processor 1; and the node 2 includes a processor 2. The multi-node system evenly divides a cache area in an SSD cache medium in the system for the node 1 and the node 2. Time for the processor 1 to access a cache area in the node 1 is a, and time for accessing a cache area in the node 2 is b; time for the processor 2 to access the cache area in the node 2 is a, and time for accessing the cache area in the node 1 is b; and b is greater than a. That is, the time for a processor to access a cache area in a local node is smaller than the time for accessing a cache area in a remote node. The node 1, relative to the processor 1, is an affinity node of the processor 1. Storage device affinity between a node that includes a processor and one or more nodes with a storage device installed thereon decreases with an increase of a hardware separation level.

In an embodiment of the present invention, when the cache area in the cache medium is divided for each node, division may also be performed according to performance of a node processor. For example, performance of the processor in the node 1 is higher than performance of the processor in the node 2, so the obtained divided cache area in the node 1 is greater than the obtained divided cache area in the node 2.

In step S202, each of the sub-areas is divided into a thread cache area and a global cache area where there is a mapping established between the thread cache area and the disk array by adopting an associative mapping manner; and there is a mapping established between the global cache area and the disk array by adopting a set-associative mapping manner.

In this embodiment, the obtained divided sub-area of each node is further divided into two areas; one is a thread cache area; and the other is a global cache area. A manner of division is not limited to even division. The thread cache area and the disk array adopt the associative mapping manner to establish the mapping. The global cache area and the disk array adopt the set-associative mapping manner to establish the mapping.

Figure 3:
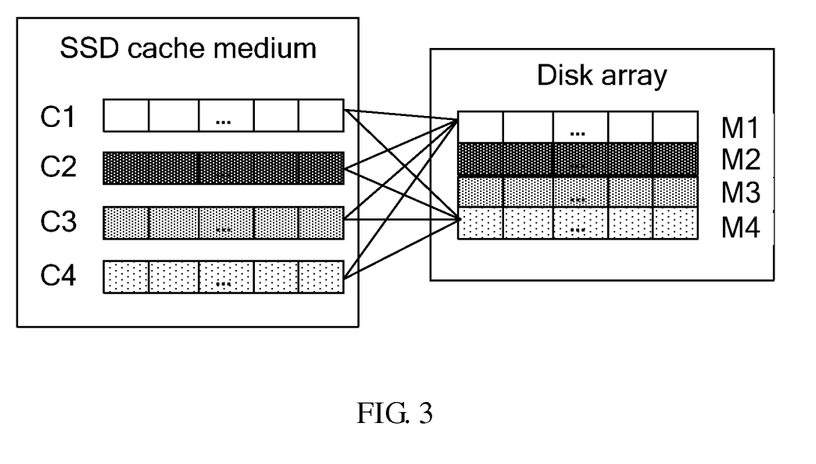
FIG. 3 is a schematic diagram of an associative mapping manner in Embodiment 1 of the present invention.

The associative mapping manner is as shown in FIG. 3. The number of blocks of the cache area is C; the number of blocks of the disk array is M; and the total number of associative mappings is C×M. Any block in the disk array may be mapped to any block in the cache area.

If data in the disk array is already stored in a certain block of the cache area, a block number of the disk array is stored in a tag of the block. When a processor needs to access the data, an address of the data in the disk array (the block number+an in-block address) is provided. Searching is performed in the cache first, and the block number is compared with tags of all blocks in the cache area. If a hit is achieved, the block number and the in-block address form an address for accessing the cache area. If no hit is achieved, according to the address, the data is read from the disk array. Adopting the associative mapping manner increases a utilization rate of a cache space and a hit rate of accessing data.

The set-associative mapping manner is as shown in FIG. 1. The disk array and the cache area are divided into blocks according to the same size. The disk array and the cache area divide the blocks into groups according to the same size. The disk array is an integer multiple of cache capacity. A disk array space is divided into partitions according to the size of the cache area. The number of groups of each partition in the disk array is the same as the number of groups of the cache area. When data in the disk array is transferred into the cache area, the group number of the disk array and that of the cache area shall be equal, that is, a certain block in each partition can only be stored in a space of the same group number in the cache area, but arbitrary storage can be performed between block addresses in the group, that is, a direct mapping manner is adopted between a group of the disk array and a group of the cache area, and an associative mapping manner is adopted in two corresponding groups.

When data access is performed, first, according to the group number, a catalog of each block included by the group is found in a catalog table, and then a disk array partition number of the accessed data and an in-group block number of the accessed data are compared with the catalog of each block in this group at the same time. If comparison results are equal, a hit is achieved. If the comparison results are not equal, it indicates that no hit is achieved, and the accessed data block does not enter the cache yet, and in-group substitution is performed. Through the set-associative mapping manner, a block collision probability is reduced, and a block utilization rate is increased. Storage device affinity between a node including a processor and one or more nodes with a storage device installed thereon decreases with an increase of a hardware separation level.

In this embodiment, according to the characteristic that in the associative mapping manner, any block in the disk array may be mapped to any block in the cache area. A hardware separation level between nodes that include a processor and a cache area is analyzed, and a data block in the disk array is mapped to a cache block of a corresponding affinity node thereof, thereby effectively solving the problem in the prior art that a cache cannot identify an affinity node when the set-associative mapping manner is adopted only, reducing overheads of remote access of the system, and increasing efficiency of data access.

In step S203, when a process reads a file, a read frequency of the file is detected.

In this embodiment, the system automatically records the read frequency of the file. When the process reads the file, the read frequency of the file is detected.

In step S204, it is determined whether the read frequency of the file is greater than a preset first threshold; if a determination result is "yes," step S206 is executed; and if the determination result is "no," step S205 is executed.

In this embodiment, the first threshold may be preset according to performance of a processor of the system and/or the size of a cache space. For example, when processing performance of the system is high and the cache space is large, the threshold may be set to be smaller, and data read efficiency is increased.

In step S205, when the read frequency of the file is smaller than or equal to the preset first threshold, the file is stored in the disk array.

In step S206, when the read frequency of the file is greater than the preset first threshold, it is determined whether the size of the file exceeds a preset second threshold value; if a determination result is "yes," step S207 is executed; and if the determination result is "no," step S208 is executed.

In this embodiment, when the read frequency of the file is greater than the preset first threshold, it indicates that the file is a frequently accessed file. In order to utilize the cache space more fully and effectively, the size of the file is required to be further determined. When the size of the file exceeds the preset second threshold (for example, 512K), step S207 is executed; and otherwise, step S208 is executed.

In step S207, when the size of the file exceeds the preset second threshold, the file is cached in the global cache area.

In this embodiment, the global cache area and the disk array adopt the set-associative mapping manner. Through the set-associative mapping manner, the block collision probability is reduced, and the block utilization rate is increased. However, the hit rate of the set-associative is relatively low, and therefore, in order to increase the hit rate, larger files are cached in the global cache area.

In step S208, when the size of the file does not exceed (is smaller than or equal to) the preset second threshold, the file is cached in the thread cache area.

In this embodiment, the thread cache area and the disk array adopt the associative mapping manner. When the associative mapping manner is adopted to access data, a higher hit rate may be achieved, so small files are cached in the thread cache area. Moreover, the file is cached in the cache block of a corresponding affinity node thereof, thereby increasing efficiency of file reading.

In the embodiment of the present invention, according to the characteristic that in the associative mapping manner, any block in the disk array may be mapped to any block in the cache area, and a data block in the disk array is mapped to a cache block of a corresponding affinity node thereof, thereby solving the problem in the prior art that a cache cannot identify an affinity node when the set-associative mapping manner is adopted only, reducing overheads of remote access of the system, and increasing efficiency of data access. Meanwhile, the size of the read file is determined. When the size of the file exceeds the preset second threshold, the file is cached in the global cache area, thereby reducing the block collision probability, and increasing the block utilization rate and the hit rate. When the size of the file does not exceed the preset second threshold, the file is cached in the thread cache area of the affinity node of the file, thereby not only increasing the utilization rate of the cache space and the hit rate of the file, but also increasing the efficiency of file reading.

Embodiment 2

Figure 4:
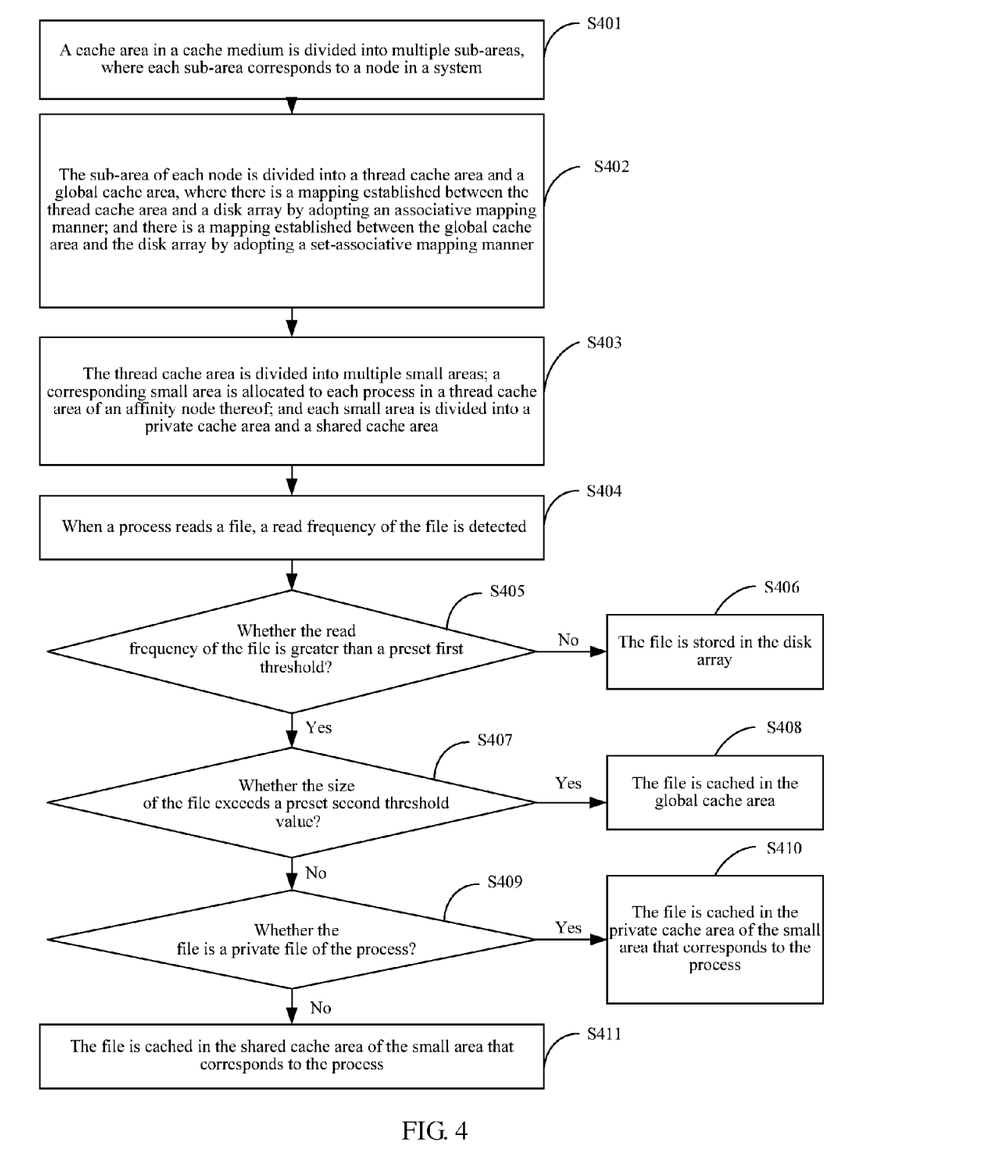
FIG. 4 is an implementation flow chart of a data cache method in a multi-node system provided in Embodiment 2 of the present invention.

FIG. 4 shows an implementation flow of a data cache method in a multi-node system provided in Embodiment 2 of the present invention, and detailed descriptions of processes of the method are as follows.

In step S401, a cache area in a cache medium is divided into multiple sub-areas, where each sub-area is corresponding to a node in a system. A specific implementation process thereof is as that described in step S201 of Embodiment 1, and is not repeated herein.

In step S402, the sub-area of each node is divided into a thread cache area and a global cache area, where there is a mapping established between the thread cache area and a disk array by adopting an associative mapping manner; and there is a mapping established between the global cache area and the disk array by adopting a set-associative mapping manner. A specific implementation process thereof is as that described in step S202 of Embodiment 1, and is not repeated herein.

In step S403, the thread cache area is divided into multiple small areas; a corresponding small area is allocated to each process in a thread cache area of an affinity node thereof; and each small area is divided into a private cache area and a shared cache area.

Figure 5:
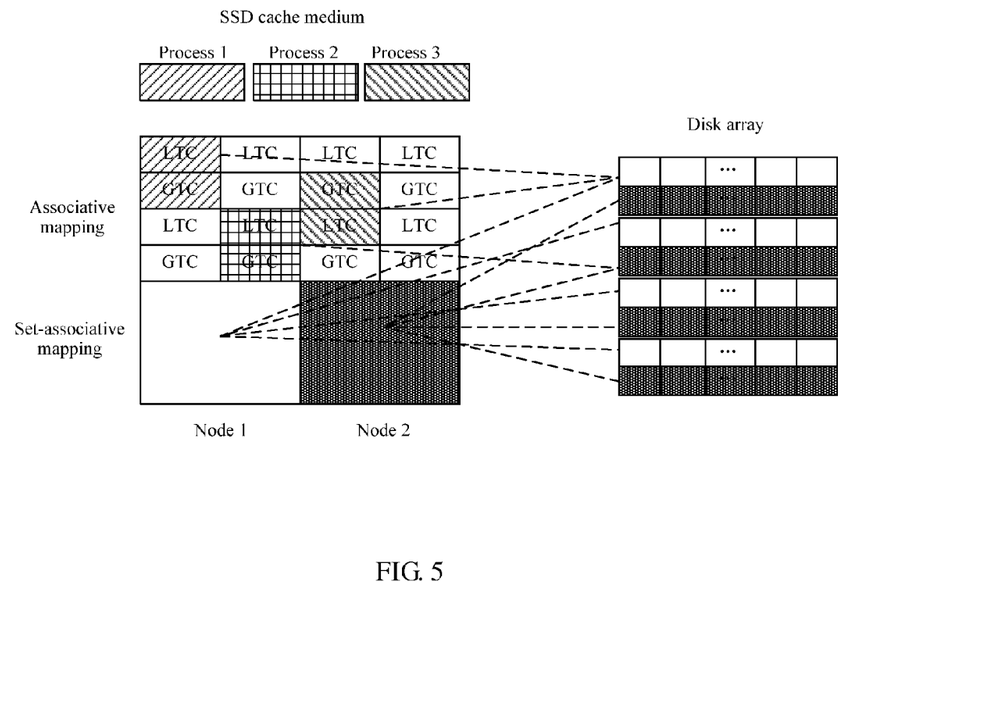
FIG. 5 is a schematic diagram of a cache mapping perceived by a process provided in Embodiment 2 of the present invention.

In this embodiment, the thread cache area is divided into multiple small thread cache areas; each small thread cache area is further divided into two areas; one is the private cache area; and the other is the shared cache area, as shown in FIG. 5. The private cache area is configured to cache private data of a corresponding process, and the data in the private cache area can only be accessed by the corresponding process, for example: a parameter set in a game process. The shared cache area is configured to cache shared data of a process, and the data in the shared cache area may be accessed by another process.

In this embodiment, for convenience of searching and unified management, a unique number is allocated to each small thread cache area, and the shared cache areas are connected in series by adopting a doubly linked list.

In this embodiment, in order to save the time of data access and reduce a communication burden between nodes, a scheduler in a multi-node system allocates a corresponding small area to each process in a the thread cache area of the affinity node through a process scheduling principle (each process has the greatest affinity with a node thereof). When a process is invoked in again, the scheduler may try to make the process be run in a processor in which the process is run previously, thereby ensuring a utilization rate of the cache space.

In this embodiment, process migration between multiple processors of the same node does not affect node affinity of the process.

In step S404, when a process reads a file, a read frequency of the file is detected. A specific implementation process thereof is as that described in step S203 of Embodiment 1, and is not repeated herein.

In step S405, it is determined whether the read frequency of the file is greater than a preset first threshold; if a determination result is "yes," step S407 is executed; and if the determination result is "no," step S406 is executed. A specific implementation process thereof is as that described in step S204 of Embodiment 1, and is not repeated herein.

In step S406, when the read frequency of the file is smaller than or equal to the preset first threshold, the file is stored in the disk array. A specific implementation process thereof is as that described in step S205 of Embodiment 1, and is not repeated herein.

In step S407, when the read frequency of the file is greater than the preset first threshold, it is determined whether the size of the file exceeds a preset second threshold value; if a determination result is "yes," step S408 is executed; and if the determination result is "no," step S409 is executed. A specific implementation process thereof is as that described in step S206 of Embodiment 1, and is not repeated herein.

In step S408, when the size of the file exceeds the preset second threshold, the file is cached in the global cache area. A specific implementation process thereof is as that described in step S208 of Embodiment 1, and is not repeated herein.

In step S409, when the size of the file does not exceed the second threshold, it is determined whether the file is a private file of the process; if a determination result is "yes," step S410 is executed; and if the determination result is "no," step S411 is executed.

In this embodiment, each file has a unique identifier, and it is determined whether a file is a private file of a current process through the unique identifier of the file.

In step S410, when the file is a private file of the process, the file is cached in the private cache area of the small area that is corresponding to the process.

In step S411, when the file is not a private file of the process, the file is cached in the shared cache area of the small area that is corresponding to the process.

In the embodiment of the present invention, the private file is cached in the private cache area, and a shared file is cached in the shared cache area, thereby making file management convenient, and increasing searching efficiency of the file. In addition, the private file is managed, thereby decreasing unnecessary frequent read and write operations of the private file, reducing write overheads of the cache medium, and improving I/O performance of the system.

Embodiment 3

Figure 6:
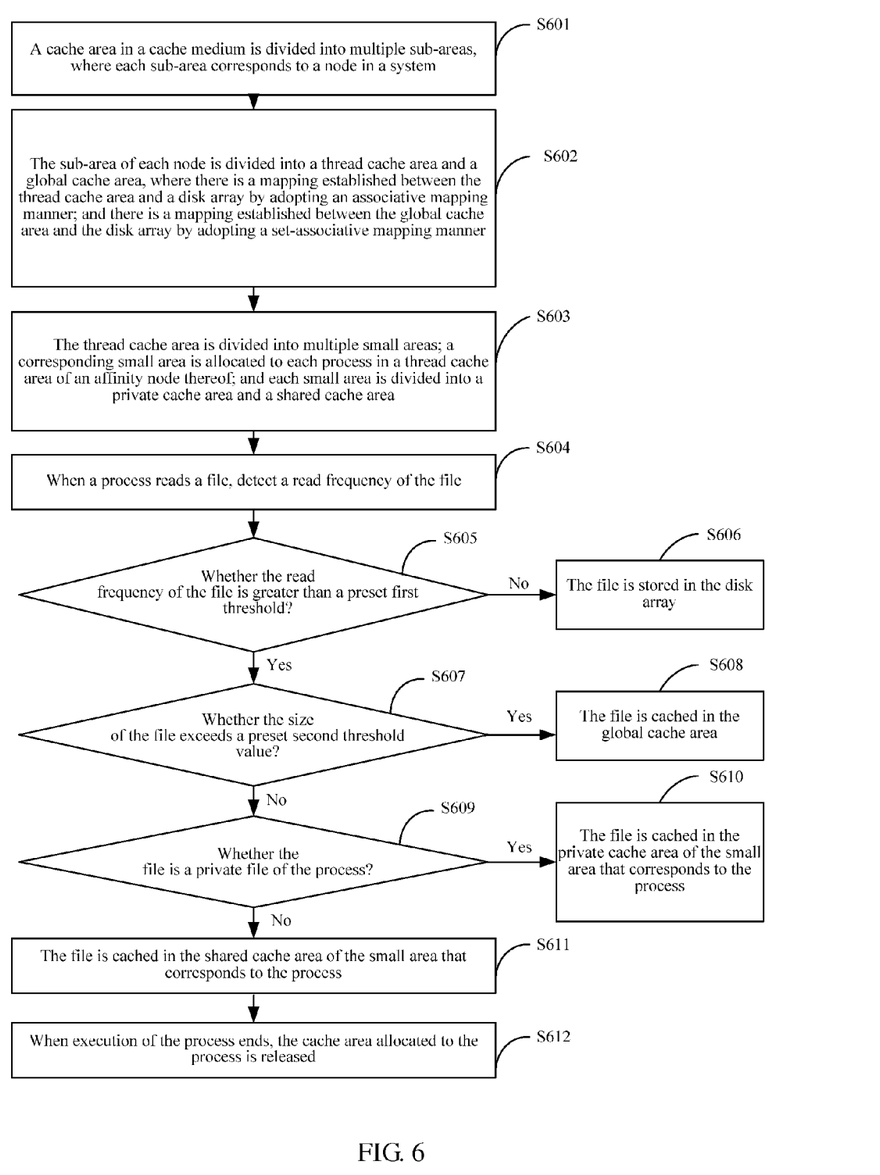
FIG. 6 is an implementation flow chart of a data cache method in a multi-node system provided in Embodiment 3 of the present invention.

FIG. 6 shows an implementation flow of a data cache method in a multi-node system provided in Embodiment 3 of the present invention, and this embodiment is added with step S612 based on Embodiment 2. Steps S601 through S611 in FIG. 6 correspond to steps S401 through S411 in FIG. 4, respectively, and the descriptions are not repeated herein.

In step S612, when execution of the process ends, the cache area allocated to the process is released.

In this embodiment, in order to save the cache space, when execution of the process ends, the cache area allocated to the process is released.

In the embodiment of the present invention, since in the prior art, the cache area is not further divided, and multiple storage space mapping manners are not adopted either, so that when a system allocates a space to each process, a cache space of a uniform size is always allocated, which is likely to cause a waste of the cache space. Moreover, when execution of the process ends, in the prior art, the whole piece of allocated cache space is released, but according to the present invention, the small cache space allocated to the process is released, thereby avoiding overheads caused by frequent read and write operations on another small cache space that is not allocated.

Embodiment 4

Figure 7:
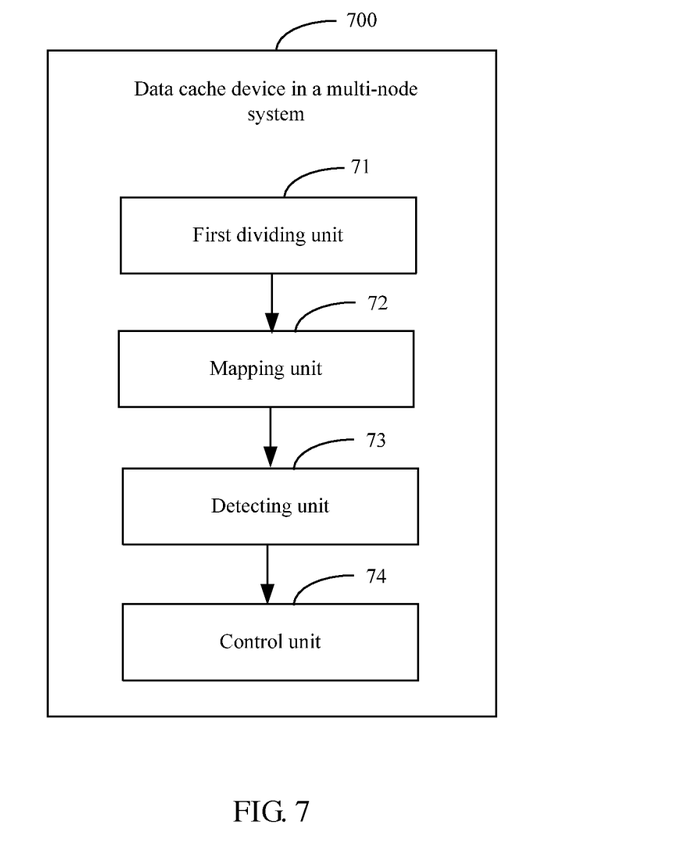
FIG. 7 is a composite structure diagram of a data cache device in a multi-node system provided in Embodiment 4 of the present invention.

FIG. 7 shows a composite structure of a data cache device in a multi-node system provided in Embodiment 4 of the present invention. For convenience of illustration, only parts related to the embodiment of the present invention are shown.

The data cache device in a multi-node system may be a software unit, a hardware unit or a unit combining software and hardware, where the software unit, the hardware unit or the unit combining software and hardware operate in application systems.

The data cache device 700 in a multi-node system includes a first dividing unit 71, a mapping unit 72, a detecting unit 73, and a control unit 74. Specific functions of each unit are as follows.

The first dividing unit 71 is configured to divide a cache area in a cache medium into multiple sub-areas, where each sub-area is corresponding to a node in the system.

The mapping unit 72 is configured to divide the sub-area of each node into a thread cache area and a global cache area, where there is a mapping established between the thread cache area and a disk array by adopting an associative mapping manner; and there is a mapping established between the global cache area and the disk array by adopting a set-associative mapping manner.

The detecting unit 73 is configured to, when a process reads a file, detect a read frequency of the file.

The control unit 74 is configured to, when the read frequency of the file is greater than a first threshold and the size of the file does not exceed a second threshold, cache the file in the thread cache area, or when the read frequency of the file is greater than the first threshold and the size of the file exceeds the second threshold, cache the file in the global cache area.

The data cache device in a multi-node system provided in this embodiment may be used in the foregoing corresponding data cache method in a multi-node system. For details, reference may be made to relevant descriptions of Embodiments 1, 2, and 3 of the data cache method in a multi-node system, which are not repeated herein.

Embodiment 5

Figure 8:
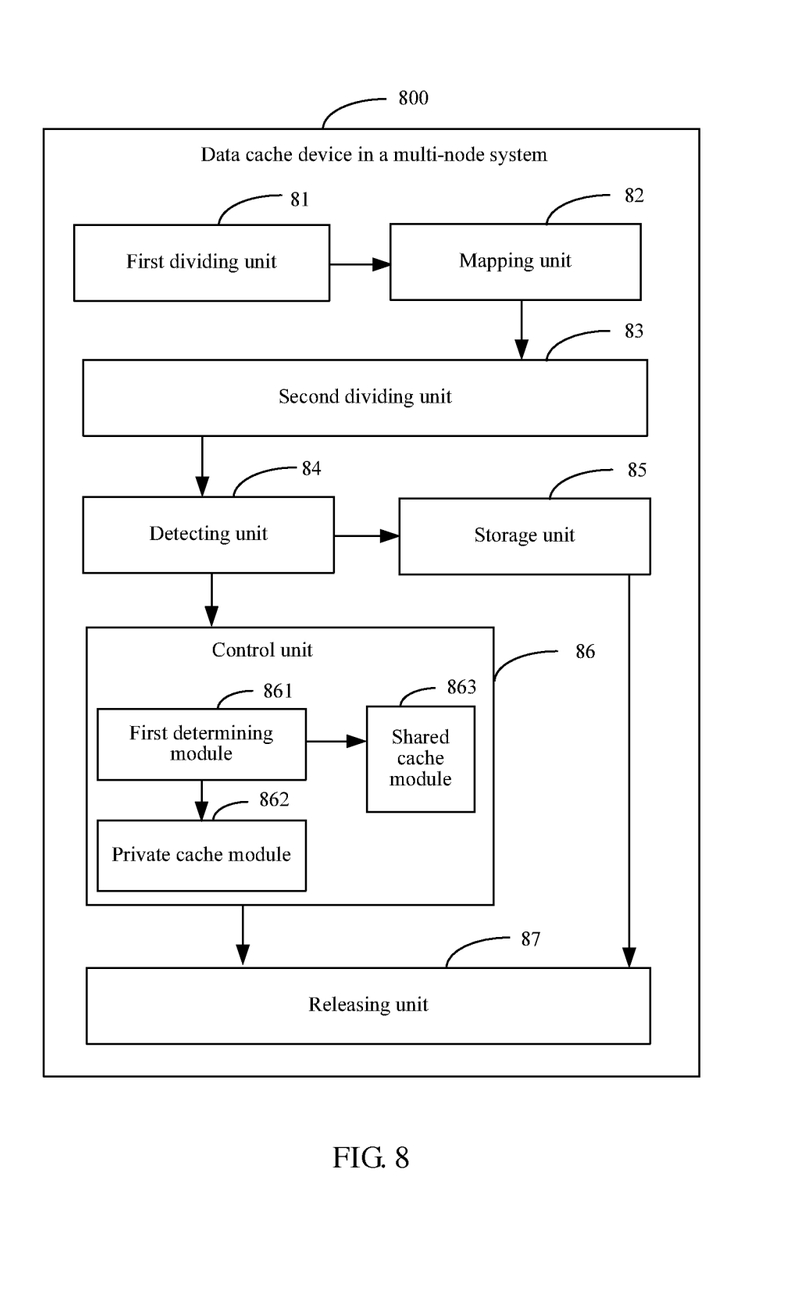
FIG. 8 is a composite structure diagram of a data cache device in a multi-node system provided in Embodiment 5 of the present invention.

FIG. 8 shows a composite structure of a data cache device in a multi-node system provided in Embodiment 5 of the present invention. For convenience of illustration, only parts related to the embodiment of the present invention are shown.

The data cache device in a multi-node system may be a software unit, a hardware unit or a unit combining software and hardware, where the software unit, the hardware unit or the unit combining software and hardware operate in application systems.

The data cache device 800 in a multi-node system includes a first dividing unit 81, a mapping unit 82, a second dividing unit 83, a detecting unit 84, a storage unit 85, and a control unit 86. Specific functions of each unit are as follows.

The first dividing unit 81 is configured to divide a cache area in a cache medium into multiple sub-areas, where each sub-area is corresponding to a node in the system.

The mapping unit 82 is configured to divide the sub-area of each node into a thread cache area and a global cache area, where there is a mapping established between the thread cache area and a disk array by adopting an associative mapping manner; and there is a mapping established between the global cache area and the disk array by adopting a set-associative mapping manner.

The second dividing unit 83 is configured to divide the thread cache area into multiple small areas, and allocate a corresponding small area to each process in a thread cache area of an affinity node thereof. Each small area is divided into a private cache area and a shared cache area. The private cache area is configured to cache private data of a corresponding process. The shared cache area is configured to cache shared data of the corresponding process.

The detecting unit 84 is configured to, when a process reads a file, detect a read frequency of the file.

The storage unit 85 is configured to, when the read frequency of the file is smaller than or equal to a preset first threshold, store the file in the disk array.

The control unit 86 is configured to, when the read frequency of the file is greater than the first threshold and the size of the file does not exceed a second threshold, cache the file in the thread cache area, or when the read frequency of the file is greater than the first threshold and the size of the file exceeds the second threshold, cache the file in the global cache area. The control unit 86 further includes a third determining module 861, a private cache module 862, and a shared cache module 863.

The first determining module 861 is configured to, when the size of the file does not exceed the second threshold, determine whether the file is a private file of the process.

The private cache module 862 is configured to, when the file is a private file of the process, cache the file in the private cache area of the small area that is corresponding to the process.

The shared cache module 863 is configured to, when the file is not a private file of the process, cache the file in the shared cache area of the small area that is corresponding to the process.

The data cache device in a multi-node system provided in this embodiment may be used in the foregoing corresponding data cache method in a multi-node system. For details, reference may be made to relevant descriptions of Embodiments 2 and 3 of the data cache method in a multi-node system, which are not repeated herein.

In another embodiment of the present invention, the data cache device in a multi-node system further includes a releasing unit 87. The releasing unit 87 is configured to, when execution of the process ends, release the cache area that is allocated to the process.

The data cache device in a multi-node system provided in this embodiment may be used in the foregoing corresponding data cache method in a multi-node system. For details, reference may be made to relevant descriptions of Embodiment 3 of the data cache method in a multi-node system, which are not repeated herein.

In the embodiment of the present invention, according to the characteristic that in the associative mapping manner, any block in the disk array may be mapped to any block in the cache area, and a data block in the disk array is mapped to a cache block of a corresponding affinity node thereof, thereby solving the problem in the prior art that a cache cannot identify an affinity node when the set-associative mapping manner is adopted only, reducing overheads of remote access of the system, and increasing efficiency of data access. Meanwhile, the size of the read file is determined. When the size of the file exceeds the preset second threshold, the file is cached in the global cache area, thereby decreasing the block collision probability, and increasing the block utilization rate and the hit rate. When the size of the file does not exceed the preset second threshold, the file is cached in the thread cache area of the affinity node of the file, thereby not only increasing the utilization rate of the cache space and the hit rate of the file, but also increasing the efficiency of file reading. In addition, the private file is cached in the private cache area, and a shared file is cached in the shared cache area, thereby making file management convenient, and increasing searching efficiency of the file. The private file is managed, thereby decreasing unnecessary frequent read and write operations of the private file, reducing write overheads of the cache medium, and improving I/O performance of the system.

All of or a part of the steps in the data cache method in a multi-node system provided in the embodiments of the present invention may be implemented by a program instructing relevant hardware. For example, implementation may be performed by using a computer to run the program. The program may be stored in a readable storage medium, for example, a random access memory, a magnetic disk and an optical disk.

What is claimed is:

1. A data cache method in a multi-node system, wherein the multi-node system comprises a cache medium and a disk array, and wherein the method comprises:
dividing a cache area in the cache medium into multiple sub-areas, wherein each sub-area corresponds to a node in the multi-node system;
dividing each of the sub-areas into a thread cache area and a global cache area, wherein a mapping is established between the thread cache area and the disk array by adopting an associative mapping manner, and wherein a mapping is established between the global cache area and the disk array by adopting a set-associative mapping manner;

detecting a read frequency of a file when a process reads the file from the disk array;

caching the file in the thread cache area when the read frequency of the file is greater than a first threshold and a size of the file does not exceed a second threshold; and caching the file in the global cache area when the read frequency of the file is greater than the first threshold and the size of the file exceeds the second threshold.

2. The method according to claim 1, wherein the method further comprises:

dividing the thread cache area into multiple small areas; and allocating, for each process, a small area of the multiple small areas to a corresponding process, wherein the small area is part of an affinity node to the corresponding process, wherein each small area is divided into a private cache area and a shared cache area, wherein the private cache area is configured to cache private data of a corresponding process, and wherein the shared cache area is configured to cache shared data of the corresponding process.

3. The method according to claim 2, wherein the shared cache areas are connected in series by adopting a doubly linked list.

4. The method according to claim 2, wherein the size of the file does not exceed the second threshold, and wherein the method further comprises:

determining whether the file is a private file of the process;

caching the file in the private cache area of the small area that is corresponding to the process when the file is the private file of the process; and caching the file in the shared cache area of the small area that is corresponding to the process when the file is not the private file of the process.

5. The method according to claim 1, wherein the method further comprises releasing the cache area that is allocated to the process when execution of the process ends.

6. The method according to claim 1, wherein the method further comprises storing the file in the disk array when the read frequency of the file is smaller than or equal to the first threshold.

7. A mapping method for data cache in a multi-node system, wherein the multi-node system comprises a cache medium and a disk array, and wherein the method comprises:

dividing a cache area in the cache medium into multiple sub-areas, wherein each sub-area corresponds to a node in the multi-node system; and dividing each of the sub-areas into a thread cache area and a global cache area, wherein a mapping is established between the thread cache area and the disk array by adopting an associative mapping manner, and wherein a mapping is established between the global cache area and the disk array by adopting a set-associative mapping manner.

8. The method according to claim 7, wherein the method further comprises:

dividing the thread cache area into multiple small areas; and allocating, for each process, a small area of the multiple small areas to a corresponding process, wherein the small area is part of an affinity node to the corresponding process, wherein each small area is divided into a private cache area and a shared cache area, wherein the private cache area is configured to cache private data of a corresponding process, and wherein the shared cache area is configured to cache shared data of the corresponding process.

9. The method according to claim 8, wherein the shared cache areas are connected in series by adopting a doubly linked list.

10. A data cache device in a multi-node system, wherein the multi-node system comprises a cache medium and a disk array, and wherein the device comprises:

a first dividing unit configured to divide a cache area in the cache medium into multiple sub-areas, wherein each sub-area corresponds to a node in the multi-node system;

a mapping unit configured to divide each of the sub-areas into a thread cache area and a global cache area, wherein a mapping is established between the thread cache area and the disk array by adopting an associative mapping manner, and wherein a mapping is established between the global cache area and the disk array by adopting a set-associative mapping manner;

a detecting unit configured to detect a read frequency of a file when a process reads the file from the disk array; and a control unit configured to cache the file in the thread cache area when the read frequency of the file is greater than a first threshold and a size of the file does not exceed a second threshold, and cache the file in the global cache area when the read frequency of the file is greater than the first threshold and the size of the file exceeds the second threshold.

11. The device according to claim 10, wherein the control unit is further configured to store the file in the disk array when the read frequency of the file is smaller than or equal to the first threshold, and wherein the device further comprises a second dividing unit configured to divide the thread cache area into multiple small areas, and allocate, for each process, a small area of the multiple small areas to a corresponding process, wherein the small area is part of an affinity node to the corresponding process, wherein each small area is divided into a private cache area and a shared cache area, wherein the private cache area is configured to cache private data of a corresponding process, and wherein the shared cache area is configured to cache shared data of the corresponding process.

12. The device according to claim 11, wherein the shared cache areas are connected in series by adopting a doubly linked list.

13. The device according to claim 11, wherein the control unit further comprises:

a first determining module configured to determine whether the file is a private file of the process when the size of the file does not exceed the second threshold;

a private cache control module configured to cache the file in the private cache area of the small area that is corresponding to the process when the file is the private file of the process; and a shared cache control module configured to cache the file in the shared cache area of the small area that is corresponding to the process when the file is not the private file of the process.

14. The device according to claim 10, wherein the device further comprises a releasing unit configured to release the cache area that is allocated to the process when execution of the process ends.

15. A mapping device for data cache in a multi-node system, wherein the multi-node system comprises a cache medium and a disk array, and wherein the device comprises:
- a first dividing unit configured to divide a cache area in the cache medium into multiple sub-areas, wherein each sub-area corresponds to a node in the system; and
- a mapping unit configured to divide each of the sub-areas into a thread cache area and a global cache area, wherein a mapping is established between the thread cache area and the disk array by adopting an associative mapping manner, and wherein a mapping is established between the global cache area and the disk array by adopting a set-associative mapping manner.

16. The device according to claim 15, wherein the device further comprises a second dividing unit configured to:
- divide the thread cache area into multiple small areas; and
- allocate, for each process, a small area of the multiple small areas to a corresponding process, wherein the small area is part of an affinity node to the corresponding process, wherein each small area is divided into a private cache area and a shared cache area,
- wherein the private cache area is configured to cache private data of a corresponding process, and
- wherein the shared cache area is configured to cache shared data of the corresponding process.

17. The device according to claim 16, wherein the shared cache areas are connected in series by adopting a doubly linked list.

18. A non-transitory computer-readable medium having computer executable instructions for performing a data cache method in a multi-node system, wherein the multi-node system comprises a cache medium and a disk array, and wherein the method comprises:
- dividing a cache area in the cache medium into multiple sub-areas, wherein each sub-area corresponds to a node in the multi-node system;
- dividing each of the sub-areas into a thread cache area and a global cache area, wherein a mapping is established between the thread cache area and the disk array by adopting an associative mapping manner, and wherein a mapping is established between the global cache area and the disk array by adopting a set-associative mapping manner;
- detecting a read frequency of a file when a process reads the file from the disk array;
- caching the file in the thread cache area when the read frequency of the file is greater than a first threshold and a size of the file does not exceed a second threshold; and
- caching the file in the global cache area when the read frequency of the file is greater than the first threshold and the size of the file exceeds the second threshold.

19. A non-transitory computer-readable medium having computer executable instructions for performing a mapping method for data cache in a multi-node system, wherein the multi-node system comprises a cache medium and a disk array, and wherein the method comprises:
- dividing a cache area in the cache medium into multiple sub-areas, wherein each sub-area corresponds to a node in the multi-node system; and
- dividing each of the sub-areas into a thread cache area and a global cache area, wherein a mapping is established between the thread cache area and the disk array by adopting an associative mapping manner, and wherein a mapping is established between the global cache area and the disk array by adopting a set-associative mapping manner.

* * * * *